(12) United States Patent
Jensen et al.

(10) Patent No.: US 6,755,043 B2
(45) Date of Patent: Jun. 29, 2004

(54) CONDENSER WITH INTEGRATED DEAERATOR

(75) Inventors: Christian Svarregaard Jensen, Skanderborg (DK); Lars Hattmann, Hojbjerg (DK)

(73) Assignee: York Refrigeration APS, Højbjerg (DK)

( * ) Notice: Subject to any disclaimer, the term of this patent is extended or adjusted under 35 U.S.C. 154(b) by 0 days.

(21) Appl. No.: 10/296,722
(22) PCT Filed: May 25, 2001
(86) PCT No.: PCT/DK01/00363
§ 371 (c)(1), (2), (4) Date: Feb. 12, 2003
(87) PCT Pub. No.: WO01/90665
PCT Pub. Date: Nov. 29, 2001

(65) Prior Publication Data
US 2003/0150233 A1 Aug. 14, 2003

(30) Foreign Application Priority Data
May 26, 2000 (DK) .......................................... 2000 00835

(51) Int. Cl.[7] .............................................. F25B 19/00
(52) U.S. Cl. .......................................... 62/268; 62/100
(58) Field of Search .......................... 62/100, 201, 268, 62/304, 430, 434

(56) References Cited

U.S. PATENT DOCUMENTS

| | | |
|---|---|---|
| 1,904,590 A | 4/1933 | Wexler |
| 2,621,492 A | 12/1952 | Beardsley et al. |
| 3,304,733 A | 2/1967 | Coffman |
| 4,353,217 A | 10/1982 | Nishioka et al. |
| 4,598,767 A | 7/1986 | Saleh |
| 5,111,670 A | 5/1992 | Furukawa et al. |

FOREIGN PATENT DOCUMENTS

JP 09-79708 A 3/1997

*Primary Examiner*—Denise L. Esquivel
*Assistant Examiner*—Malik N. Drake
(74) *Attorney, Agent, or Firm*—Nixon Peabody LLP; David S. Safran

(57) ABSTRACT

In cooling plants which work with water as both primary and secondary coolant, it is customary for use to be made of both an evaporator and a condenser which must be supplied wi5th water in the form of e.g. a spray for achieving an effective heat exchange, and out of regard for the effectiveness it is necessary for a continuous deaeration of the water to be carried out, which is effected by the sucking of air direct from the condenser, possibly supplemented with an external NCG condenser or by leading the supply water through a pre-deaerator under vacuum. With the invention it has been found possible to configure both the evaporator and the condenser with associated deaeration/pre-deaeration units in a fully integrated manner, namely by mounting a pair of sieve plates in a vacuum container for the dividing of the container into an upper supply- and distribution chamber, a centremost pre-deaeration chamber (one or more), and a bottom chamber in the form of an evaporator- and a condenser chamber respectively. From the sieve plates, the water will flow down in many thin jets, which in the deaerator chamber can be pre-deaerated by a moderate suction pressure for independent air separation, while the thin jets introduced into the bottom chamber can create effective heat exchange therein. The exchange of heat can be made additionally effective by use of a jet-breaking insert in the form of e.g. a net in the bottom chamber. The sucking of air from the condenser and from the pre-deaeration stages is arranged with stepwise air concentration units and pumps for minimizing the necessary vacuum pump capacity and energy consumption.

11 Claims, 1 Drawing Sheet

CONDENSER WITH INTEGRATED DEAERATOR

Figure 1:
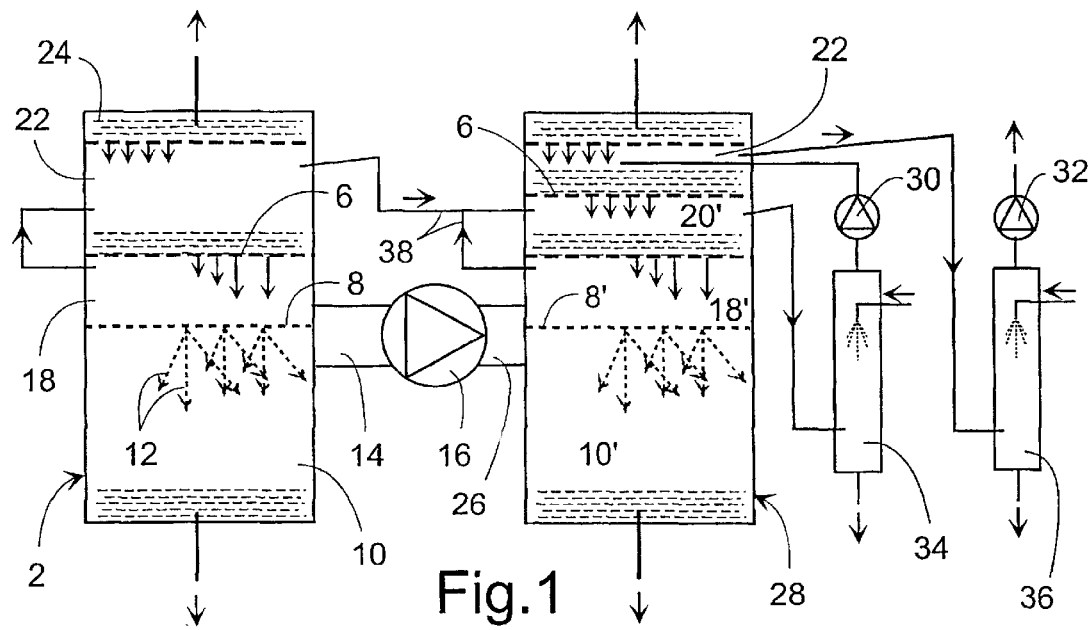

The present invention concerns a cooling plant of the type in which water is used as coolant, which can hereby be used either as cooled process water or as both primary and secondary coolant in closed cooling systems. Other application possibilities will be found in connection with heat-pump installations and the production of ice, which can be generated directly in the evaporator part of the plant. In such plants there is no need for separation surfaces in the evaporator and condenser units so that these units can be both inexpensive and highly effective. The plants can with advantage be used in cases where cold water at temperatures a few degrees above zero is required, e.g. at 5–10° C. for cooling of e.g. processes and for air conditioning.

The plants work in accordance with the basic principle that the supply water, e.g. at a temperature of 10°–20°, is introduced into an evaporation chamber which is connected to the suction side of a steam compressor, which creates a strong vacuum in the chamber, e.g. in the order of 5–15 mBar, whereby the water expands while giving off a certain amount of steam which, despite a modest percentage of water, nevertheless represents such a high measure of evaporation heat that the residual water is significantly cooled, and it is therefore possible to achieve that the outlet water can be discharged at a temperature which is only approx. 0.5–1° C. higher than the evaporation temperature.

As is the case with other coolants, there is effected a condensation of the coolant steam in a condenser which is cooled from outside, but with the present plant it also applies that work can be effected on the condenser side with immediate heat exchanging, i.e. condensation of the steam directly by means of water, so that both steam and water are introduced into one and the same condensation chamber. The steam is condensed in the cooling water so that this is heated, but again here it applies that the outlet water can be discharged with a temperature which is only approx. 0.1–1° C. lower than the condensation temperature. The cooling water for the condenser is connected to an external cooling circuit via a cooling tower for cooling, for example from 25° to 20°. The amount of water added from the condensate will thus be introduced directly into the circulating water from which, however, water will disappear by evaporation from the free surface in the cooling tower. Consequently, it must be noted that water must be operatively removed or added from or to this cooling circuit.

In principle, all this quite corresponds to more ordinary cooling plants with separate circuits for coolant and working medium. However, a considerable difference arises hereby in that there will constantly appear a content of non-condensable gas in the water, namely atmospheric air, which in a quite necessary manner must be removed to a degree which is sufficient to ensure that it does not interfere with the function of the plant. Air will arise in the supply water to the evaporation unit, but to an even greater degree in the supply water from the cooling tower to the condenser unit, where the water will be literally saturated with air. A related build-up of a distinct partial air pressure in the condenser will have a directly detrimental effect on the overall efficiency of the plant, primarily by increasing the condensation pressure against which the steam compressor must work, which results in a distinct increase in the consumption of energy.

It is in light of this that it is absolutely necessary and quite normal to arrange an effective separation of the air on the condenser side. This can naturally be effected directly via the associated vacuum pump, but because of a considerable content of steam in the air/steam mixture, this will demand an unrealistically large pump and a relatively great amount of energy. It is therefore well-known to insert a so-called NCG condenser (Non Condensable Gas) between the vacuum pump and the condenser chamber, into which NCG condensers there is constantly injected a certain smaller amount of the supply water to the main condenser, whereby there is brought about a part-condensation of that steam which is hereby sucked from the main condenser. The condensate is pumped out parallel with the discharge water from the main condenser, and the air/steam mixture, which via the vacuum pump must be compressed to atmospheric pressure, thus contains a reduced amount of steam.

In other connections it is known that alternatively there can be arranged a separate, preceding de-aeration of the water before this is injected into the condenser, namely by arranging a deaeration container above the condenser, the upper chamber of said container being connected with the necessary vacuum pump, and which during operation serves to receive the supply water for delivery to the condenser while maintaining the upper chamber in a state in which it is not filled with water. By the prevailing low pressure, there can occur a quite effective deaeration of the water from the widespread surface of the water in the container, so that the water introduced into to the condenser can be almost without any content of air. The sucking of the steam and residual air from the condenser can be effected via a connection from the condenser directly to the said upper chamber, in which a certain condensation of the steam will take place. Such pre-deaeration systems can be quite effective, but in this connection the known systems have a distinct disadvantage which will be discussed in the following.

In order to explain the invention, it is first required that the condenser itself is described in more detail. This traditionally involves a vacuum container which in principle is of simple construction and provided with a bottom outlet for water, and with one or more injection nozzles for the supply water, which must exchange energy with the steam from the steam compressor, in that the container also has an inlet opening for this steam. The container also has a discharge opening for the sucking out of the residual air and steam mixture via the already mentioned vacuum pump for maintaining a desired partial air pressure in the container. The injection nozzle(s) are configured with the object of providing a strong, spray-like jet of water, i.e. with fine droplets, which ensures a good exchange of heat with the generated steam, but also an almost total expulsion of the content of air in the water. Ideally, the air should remain in the water, so that they could be discharged together, but under the given conditions this will be a physical impossibility.

For the necessary comminution of the water through the use of the injection nozzles, a certain external over-pressure is required, for example of 0.6–0.9 bar. This is appropriate in that the supply water can be introduced at atmospheric pressure, e.g. from a cooling tower circuit, in that the necessary pressure difference will thus be brought about by the under pressure which prevails in the condenser chamber.

With the invention, the main object is to establish a cooling plant of the type in which work is effected with pre-aeration of the water, in that this potentially provides the best economy of the plant. However, there will hereby arise the aforementioned disadvantage with the pre-aerated systems, namely that work in the pre-aeration container must be effected at such a low pressure that the resulting over-pressure for the injection of water through the condenser's nozzle system becomes completely inadequate. By a relevant known technique, though in another connection, this problem is solved by the pre-aeration container being physically placed at such a distinct height above the condenser that, in the connection down to this, there will arise a water column of such a height, typically in the order of 0.5–10 m, that despite the low pressure in the aeration unit there can still be established the necessary overpressure for an effective injection of water through the condenser's injection nozzle(s).

However, this involves a highly inconvenient demand for a large overall construction height of the plant, and respectively considerable extra plant expenditure and significant constructional disadvantages. Use could be made of a separate pump for the building-up of the necessary injection pressure, but this would also involve extra installation and operational costs.

With the invention it has surprisingly proved that there is a possibility of working with a pre-aeration by using a pre-aeration container placed immediately above the condenser, namely by the condenser itself being modified in such a manner that the said injection nozzles can be dispensed with, while instead configuring the condenser with an upper distribution chamber which, down towards the condenser chamber, is limited by a sieve plate with a large number of perforations in the form of narrow holes or slots. Regardless of the water level, e.g. 25–200 mm, in the distribution chamber, by force of gravity the water will fall down into the condenser chamber in a large number of thin streams, which together have a very large surface area, and furthermore which are dissolved into small droplets after a quite modest fall height. In this way, the comminution of the water can be sufficient to achieve a quite effective exchange of heat in the condenser chamber, without the water having to be supplied at a high overpressure, and precisely therefore the pre-aeration container can be arranged directly over the condenser, i.e. with low total construction height.

According to the invention, this can be utilised with great advantage in that the pre-aerator is integrated directly with the condenser, namely merely in the form of one or more chambers formed in between sieve plates at the top of the vacuum container, which otherwise constitutes the condenser. Seen as a whole, this will be able to be configured as an integrated unit without any appreciable increase in construction height.

In that the said distribution chamber can stand under the same pressure as the condenser chamber, work can be effected with a common steam/air induction from both of these chambers, whereby the distribution chamber will appear as a functionally integrated part of the condenser, i.e. as a combined distribution and de-aeration chamber. It is possible, however, by a serial suction from the condenser chamber to the distribution chamber, and from here to the vacuum pump, to achieve a certain part-condensation of the steam fraction in the distribution chamber, whereby this chamber can work with a real pre-aeration effect.

An additional pre-aeration chamber can, however, be established in a very simple manner as an immediately overlying chamber between a sieve plate which forms the top in the distribution chamber, and an overlying sieve plate which forms the bottom in an upper distribution chamber. In the upper pre-aeration chamber there will thus also be supplied water in a large number of down-falling, thin streams, from which despite a modest fall height there can still be extracted a very large part of the air content, and here there can thus be effected a considerable air separation at a higher pressure level than by the condenser pressure, i.e. a real pre-aeration at a pressure from which distinctly less energy is required to compress the air fraction to atmospheric pressure.

There can hereby with advantage be arranged a beneficial two- or multi-stage aeration of the water. The suction from the individual de-aeration stages can be connected via an air-concentration unit and a pump to the next, physically overlying pre-de-aeration stage, so that a stepwise concentration and compression of the air is achieved. The pump from the last stage compresses the air up to atmospheric pressure. For effective concentration of air in the individual air-concentration units, it has been found especially advantageous and simple to take a quite small part-stream of relatively cold water, preferably from the evaporator outlet, which by spraying-out in the air concentration units some of the steam is condensed from the sucked-off mixture of air and steam, i.e. a lowering of the steam's partial pressure.

It is hereby possible to work with absolutely minimised pump equipment for de-aeration of the water.

As far as the effect of the actual condenser is concerned, with the invention it has been ascertained that a significant improvement can be achieved by mounting a jet/droplet-breaking insert, e.g. in the form of a simple net material, in the condenser chamber. When the net mesh is of the same size as the thickness of the water jets/droplets, there will hereby arise such a decomposition of these that they are shattered by the otherwise unhindered passage through the net, so that under the net there is formed a spray-like cloud of fine droplets, which even with a relatively short fall height can effect a distinct extra contribution to the exchange of heat. It has been found that this effect is best achieved when the net is arranged at the level where the jets of water have just changed to droplet form. In that the heat exchange can already be good enough, the addition of the net instead can be used to reduce the fall height of the droplets, so that an effective/compact condenser with a further reduced construction height can be achieved.

Also where the evaporator is concerned, though to a lesser degree, it is relevant to arrange a deaeration of the supply water, and also here work can with advantage be effected in accordance with quite the same principles, so that the evaporator with associated pre-deaeration chamber can also be configured in a fully integrated manner.

The invention will thus make it possible to build a cooling machine of the type discussed in a very compact configuration with low construction height, and rendered cheaper both by the beneficial integration of air separators in the evaporator- and condenser-containers themselves, and by the simplified pump equipment for effecting the necessary air separation.

Figure 2:
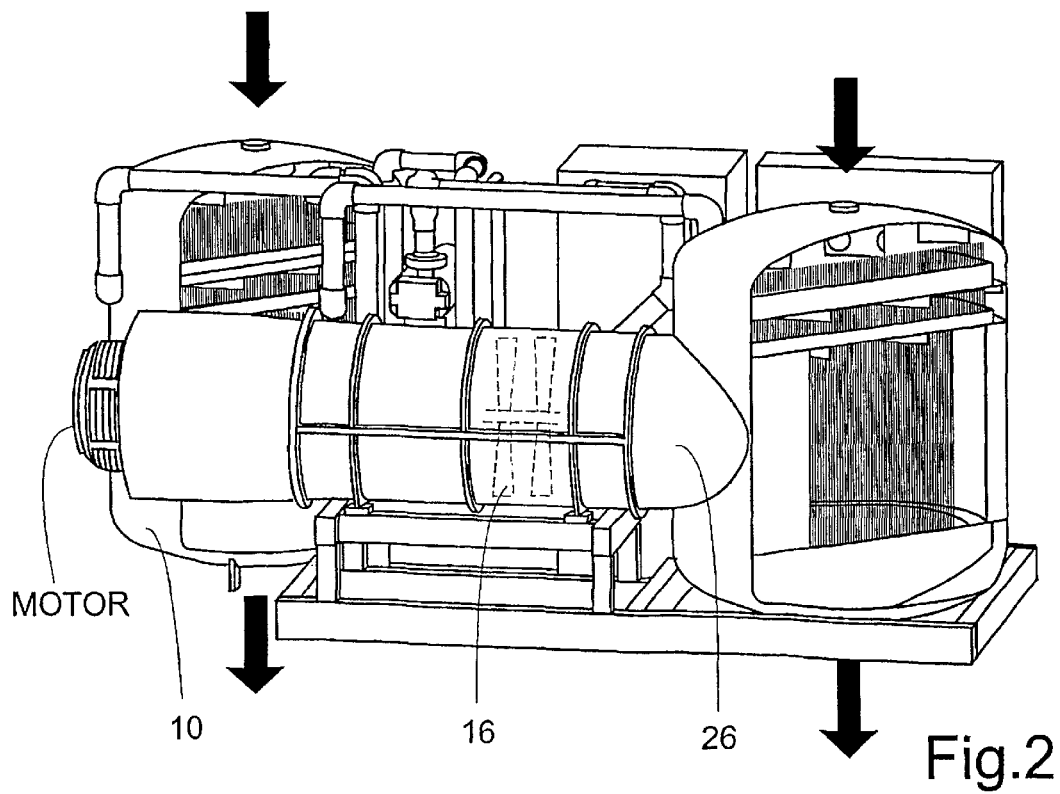

In the following, the invention is explained in more detail with reference to the drawing, in which FIG. 1 schematically shows a cooling plant according to the invention, and FIG. 2 shows an example of the practical construction of such a plant.

The shown plant comprises an evaporator container 2 with an upper inlet 4 for water, e.g. at a temperature of 12° C., and with a pair of perforated, intermediate bottoms or distribution nozzle plates 6 from which the water flows down in thin, individual jets, and a lowermost jet/droplet-breaking insert in the form of e.g. a net 8 which shatters the falling jets/droplets, so that the water falls as fine droplets down into a bottom chamber 10 with an effective dispersion, as indicated by the arrow 12, which results in a further improvement of the effectiveness of the heat exchange.

The evaporator chamber 10,18 is connected via a suction line 14 to a steam compressor 16 which works with a sufficiently low suction pressure of e.g. 9 mB, whereby an appreciable evaporation from the water jets/drops is effected, and herewith an associated cooling of the remaining water, which can then be pumped out from the bottom of the chamber, e.g. at a temperature of 6° C.

The steam compressor 16 compresses the steam, e.g. with a factor 3.7 to approx. 33 mB at an appreciably increased temperature, and this steam is fed via an inlet pipe 26 to a condenser container 28 which, in principle, can be identical to the evaporator container 2, and in which the hot steam must now be cooled and condensed, which can be effected by direct heat exchange with the colder water, preferably water which is led from/circulates in a cooling tower. This water can be fed into the upper inlet chamber 24' in the container 28 at a temperature of, e.g., 20° C., after which in the chamber 18', 10' it is thus brought into direct contact with the hot steam, and hereby absorb this in condensed form, again without the use of separation surfaces between cooling agent and steam/condensate. The end product in the bottom of the container 28 will be water, which from the above-mentioned approx. 20° C. has been heated to e.g. approx. 25°, and which stands under the said low pressure of e.g. 33 mB. This water can then be pumped out for feeding to said cooling tower circuit for cooling to the said inlet temperature of approx. 20°. The surplus water, which in this circuit is due to the continuous introduction of steam condensate, will be able to be given off to the atmosphere by the evaporation which takes place in the cooling tower.

By use of the drop-shattering insert in the form of net surfaces 8 and 8', the same improvement in effectiveness is achieved as that mentioned for the evaporator.

The upper admission chambers 22,22',20' in the containers 2 and 28 will function as air separation chambers, from which the air which is separated from the supply water can be sucked out.

The spaces in between the perforated distribution plates/nozzle plates 6 and 6' will be mutually separated from the point of view of pressure, the reason being that the perforations are held "closed" by being blocked by the downflowing water, by water impoundment above the perforations. Work can therefore be effected with decreasing pressure downwards but, however, also with a sufficiently low pressure in said spaces, so that a quite large part of the content of air in the thin jets of water can be extracted, also even though work is effected with relatively short fall distances. Consequently, it will only be a modest part of the air which comes to be released at the quite low pressure in the chambers 10, 18 and 10', 18' respectively.

It now remains to suck off the separated air and compress it up to atmospheric pressure. With the said pre-deaeration concept, the pressure in the considered pre-deaeration chamber/suction chamber will be far below atmospheric pressure, and at this low pressure the separated air will have a relatively high content of steam, which means that despite the improvement made by use of the pre-deaeration concept, use will still have to be made of a vacuum pump with relatively large capacity, i.e. an expensive pump, in order to bring the air fraction up to atmospheric pressure.

To remedy this, with the invention use is made of an arrangement for concentrating the air fraction in two stages. By means of a pump 30, air/steam is sucked from the condensation chamber 10',18' (via the space 20') to an external air concentration unit 34 into which cold water is injected, preferably fetched from the outlet of the evaporator, i.e. water at a temperature of e.g. 6°. In the chamber 10',18', the condensation temperature will typically be approx. 26°, corresponding to a total pressure of approx. 33 mB, of which the partial pressure of the air will only be approx. 1 mB. In that the temperature inside the air concentration unit 34 is lowered to approx. 10°, the partial pressure of the steam will fall considerably, namely to approx. 12 mB, while the partial pressure of the air at the said approx. 33 mB will thus be approx. 21 mB. Even at this increased level of air concentration it will require a very costly and very energy-consuming pump to compress the air to 1 bar, but then use is made of the fact that it is sufficient for the pump 30 to bring the pressure up to e.g. approx. 80 mB, namely by connection to the admission chamber 22' in the condenser 28, where the supply water at approx. 20° will bring about a steam partial pressure of approx. 23 mB, while the air's partial pressure thus becomes approx. 57 mB. It is practicable and much less power-demanding for a simple pump 30 to increase the total pressure from the said approx. 21 mB to the said approx. 80 mB.

In this stage (22'), suction is effected from the latter pressure level to a second air concentration unit 36 by means of a pump 32 which has an outlet to the atmosphere. Cold water is also injected into this container, where the steam's partial pressure is reduced to approx. 12 mB, i.e. the air's partial pressure at the said 80 mB will thus be approx. 68 mB, corresponding to a concentration of approx. 70 times up from the original approx. 1 mB in the condensation chamber 10',18'.

As shown, it has been found expedient to provide a pipe connection 38 from the pre-aeration chamber 20' to the pre-deaeration chamber 22 in the condenser unit 10, in that there will also arise a certain separation of air from the supply of piped water. The total pressure in the chamber 22 will be slightly higher than in the chamber 20', so that separated air will flow of its own accord to the chamber 20'.

With the effective and compact pre-deaerator concept and the sufficiently effective exchange of heat with the many thin jets/droplets with the nozzle-plate concept, even with a limited fall height, the integration of the air separators in the containers 2 and 28 is made possible for achieving a low construction height and a compact plant, such as illustrated in FIG. 2. By use of the jet/droplet-breaking insert in the form of e.g. a net, it is ensured that the water falling down is dispersed sufficiently for a very effective and immediate heat exchange between the steam and cooling water, whereby as discussed above a further reduction in the fall height becomes possible and herewith in the overall construction height.

It shall be mentioned that with the disclosed integration of the deaerator units, it is not only possible to use one and the same vacuum container in the two main units, but also to achieve that the lower chamber 22,20' in the deaerators will in the integrated manner constitute an upper distribution chamber for the water to the evaporator/condenser chamber, whereby a separate distribution chamber can be completely dispensed with.

The plant shown in FIG. 2 has a cooling capacity of 1.6–2 MW. This type will mainly be in the capacity range from 50 kW and above but, however, not necessarily limited hereto.

In the 1.6–2 MW plant shown in FIG. 2, the evaporator unit with integrated deaerator 2 has a diameter of approx. 2 m and a height of approx. 2 m, and the fall height for the water in the evaporator chamber 18 and 10 is approx. 1 m.

The condenser unit with integrated deaerator has a diameter of approx. 1.5 m and a height of approx. 2 m, and the fall height for the water in the condenser chamber 18' and 10' is approx. 1 m.

All else being equal, it applies to both units that an embodiment without the efficiency-promoting insert 8 will have a fall height of between 2–3 times greater. The efficiency-promoting insert 8 can be a net with a mesh size in the order of 2–4 mm and be placed approximately in the centre.

The specific compactness and capacity of the units have been correspondingly improved. To this can be added the improvement of the compactness and capacity by the integration of the deaerator units. The resulting specific capacity including the integrated deaerator thus lies in the range of 2–3.5 m$^3$ per MW.

With the integrated 2-stage deaerator system with associated air concentration units 34 and 36, the pump capacity is reduced to 500–700 m$^3$/h for the vacuum pumps 30 and 36 respectively which, all else being equal, corresponds to a reduction factor of 3–4 in comparison with conventional configurations. The associated power consumption for the vacuum pumps is correspondingly reduced.

What is claimed is:

1. A cooling plant which operates with water as both a primary and secondary coolant comprising:

a steam compressor having a suction-side and an outlet side;

an evaporator chamber connected to the suction-side of the steam compressor to enable steam to be drawn from the evaporator chamber;

a condenser chamber connected to the outlet side of the steam compressor which condenses steam by immediate heat exchange with through-flowing water; and a deaerator unit for feed water to the evaporator chamber and a deaerator unit for feed water to the condenser chamber, each of which are connected to suction equipment to enable deaeration at lowered pressure;

wherein the condenser chamber includes an upper distribution chamber for receiving feed water in which the lower portion of the upper distribution chamber is defined by a sieve plate or a nozzle plate with a plurality of perforations in the form of narrow holes or slots, and wherein the deaerator unit for the condenser chamber is positioned a short distance above the condenser chamber.

2. The cooling plant of claim 1, wherein both the distribution chamber and the deaerator unit are integrated in a vacuum chamber which houses the condenser chamber such that the distribution chamber, deaerator unit and condenser chamber are each separated from the other by a sieve plate or a nozzle plate.

3. The cooling plant of claim 2, wherein the evaporator chamber is configured with a distribution chamber and the deaerator unit in the same manner as the condenser chamber.

4. The cooling plant of claim 1, wherein the evaporator chamber is configured with a distribution chamber and the deaerator unit in the same manner as the condenser chamber.

5. The cooling plant of claim 1, wherein the condenser chamber further comprises an intermediate plate of droplet-breaking material positioned below the sieve plate or nozzle plate for disintegration of water falling from the sieve plate or a nozzle plate onto the intermediate plate.

6. The cooling plant of claim 1, wherein an intermediate plate is positioned below the sieve plate or nozzle plate at a level in which water jetting from the sieve plate or nozzle plate changes into droplet form.

7. The cooling plant of claim 1, wherein each deaeration unit is connected to one or more air concentration units each of which operates at successively increasing pressure levels through progressive steam condensation by the injection of cold water and subsequent compression of the air.

8. The cooling plant of claim 7, wherein the suction of air/steam from the distribution chamber flows, via a series connection, from a source of suction of the condenser chamber, wherein the suction of the air/steam from both the distribution chamber and the condenser chamber leads to the same air concentration unit and a deaeration unit is positioned above the distribution chamber and connected to successively-coupled air concentration units functioning at successively higher pressure, and wherein a vacuum pump associated with each air concentration unit compresses the residual steam and air up to atmospheric pressure.

9. The cooling plant of claim 7, wherein each air concentration unit is cooled by water from an inlet connected to a cold-water outlet of the evaporator chamber.

10. The cooling plant of claim 1, wherein the distribution chamber is capable of functioning as a deaeration chamber.

11. The cooling plant of claim 10, wherein the suction of air or steam from the distribution chamber occurs, via a series connection with the condenser chamber, from a source of suction from the condenser chamber.

* * * * *